United States Patent [19]

Kimak

[11] Patent Number: 4,862,524
[45] Date of Patent: Sep. 5, 1989

[54] DIVERTER VALVE

[75] Inventor: Daniel Kimak, Middlefield, Ohio

[73] Assignee: Emogene Kimak, Middlefield, Ohio

[21] Appl. No.: 877,532

[22] Filed: Jun. 23, 1986

[51] Int. Cl.$^4$ ............................................... E03C 1/00
[52] U.S. Cl. ..................................... 4/192; 137/625.5; 4/191
[58] Field of Search .................... 4/191, 192; 251/353, 251/354; 137/625.5, 625.49

[56] References Cited

U.S. PATENT DOCUMENTS

| | | | |
|---|---|---|---|
| 2,000,791 | 5/1935 | Schmiedeknecht | 137/625.49 X |
| 3,602,244 | 8/1971 | Ward | 4/191 X |
| 3,733,047 | 5/1973 | Allen | 137/625.5 X |
| 4,230,156 | 8/1980 | Frantz | 137/625.5 |
| 4,561,468 | 12/1985 | Kreitchman et al. | 137/625.5 |

Primary Examiner—Charles E. Phillips
Attorney, Agent, or Firm—Watts, Hoffmann, Fisher & Heinke

[57] ABSTRACT

A diverter valve device including a valve body with inlet portions and first and second outlets, a central passage, a flow control orifice, a valve seat and valve member reciprocatable within and partly received within the body and having an internal passage with a first end within the body and a second end forming a second outlet. A first seal is positioned for selectively closing the flow control orifice when the valve member is in the first position, and a second seal for closing the first end when the valve member is in the second position. The valve member is mechanically biased to the first position, and includes surfaces constructed to be acted upon by the pressure of fluid flowing through the body to retain the member in the second position during such flow.

5 Claims, 3 Drawing Sheets

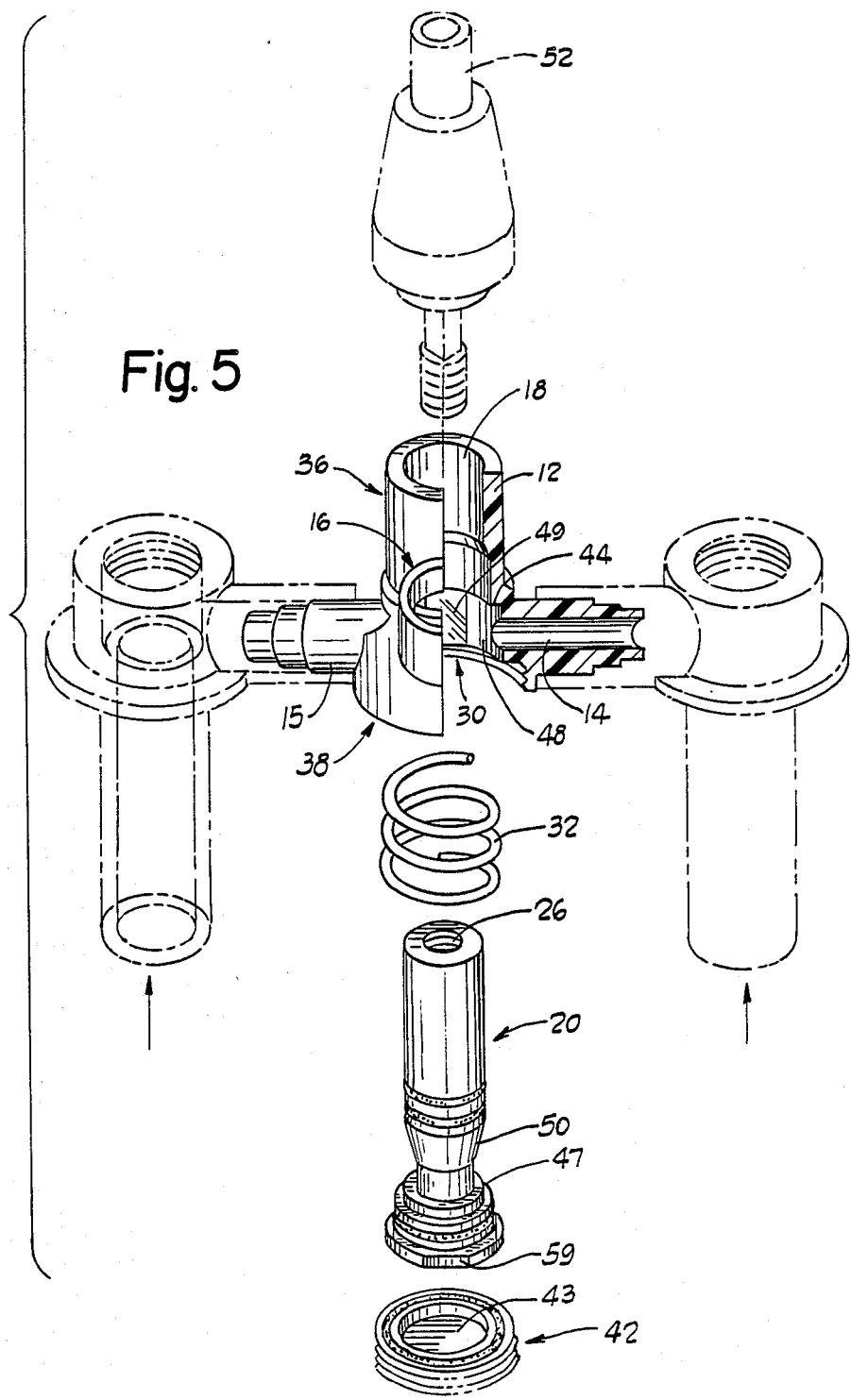

DIVERTER VALVE

DESCRIPTION

TECHNICAL FIELD

The present invention relates to diverter valves and more particularly to valves employed for diverting the flow of water in plumbing fixtures.

BACKGROUND ART

Diverter valves used in plumbing fixtures are typically employed to divert water flow within fixtures to a desired outlet. Various diverter valves are used, for example, in tub/shower fixtures to divert flow from the bath tub faucet to the shower head above the faucet.

The popularity of recreational vehicles and trailers used for camping has resulted in an increased market for a recreational unit having on-board bathing facilities similar to the bath and shower fixtures used in the home. The transfer of fixtures manufactured for the home into the camper unit environment has not, however, been a practical exchange.

There has been a need for shower stalls and shower fixtures that meet space and cost limitations for such uses.

DISCLOSURE OF THE INVENTION

The present invention provides a new, improved and inexpensive diverter valve that allows the flow of water in plumbing fixtures to be diverted between a faucet outlet and an accessory outlet, such as a shower, where both outlets are available from the same fixture and where in a preferred embodiment the diverter can be actuated by movement of the accessory conduit.

According to the invention, the valve includes a body and a valve member received within and reciprocatable within the body. The valve member is mechanically biased toward a position allowing flow through the faucet outlet. Seals are provided between the valve member and body for selectively closing the faucet or accessory outlets.

In a preferred embodiment, the valve body consists of first and second inlets, first and second outlets, a flow control orifice and a valve seat positioned between the inlets and first outlet. A principal feature of the invention is the novel valve member which has an internal passage with a first end within the body and a second end forming an outlet in communication with a flexible conduit and an accessory device. The accessory device operates upon manual movement of the valve member using the attached conduit, which results in diversion of the flow through the second or accessory outlet and the manual actuating conduit.

The member is normally reciprocatable between first and second valve positions. When in the first position, water flows to the faucet outlet, and upon movement to the second position the flow is directed to the accessory outlet. The member is biased to the first position by a spring located within the valve body, and when manually moved to the second position is retained in the second position by virtue of the construction and arrangement of surfaces of the valve member, when acted upon by the pressure of fluid flowing through the valve.

In the preferred embodiment, water leakage across inner surfaces of the valve body and outer surfaces of the valve member is prevented by seals positioned between the body and valve members. Use of the seals in this fashion prohibits water from exiting the device other than through designated outlets.

These and other features and advantages of the invention will be better understood from the following detailed description of the invention made with reference to the accompanying drawings which form a part of the specification.

BRIEF DESCRIPTION OF THE DRAWINGS

FIG. 5 is an exploded view of the diverter valve and conduits showing components of the diverter valve.

BEST MODE FOR CARRYING OUT THE INVENTION

Figure 1:
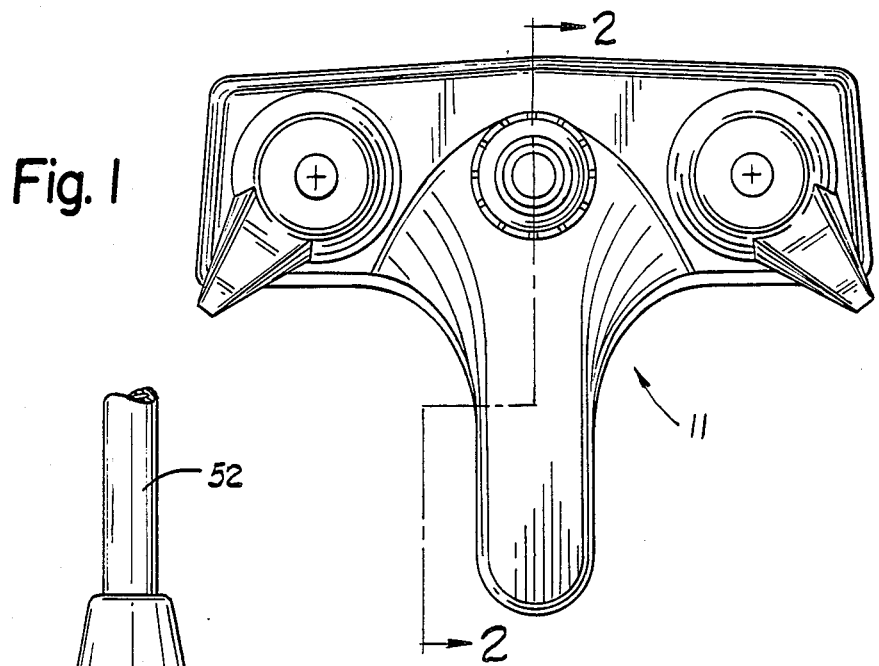
FIG. 1 is a top plan view of a plumbing fixture incorporating the present invention.
Figure 2:
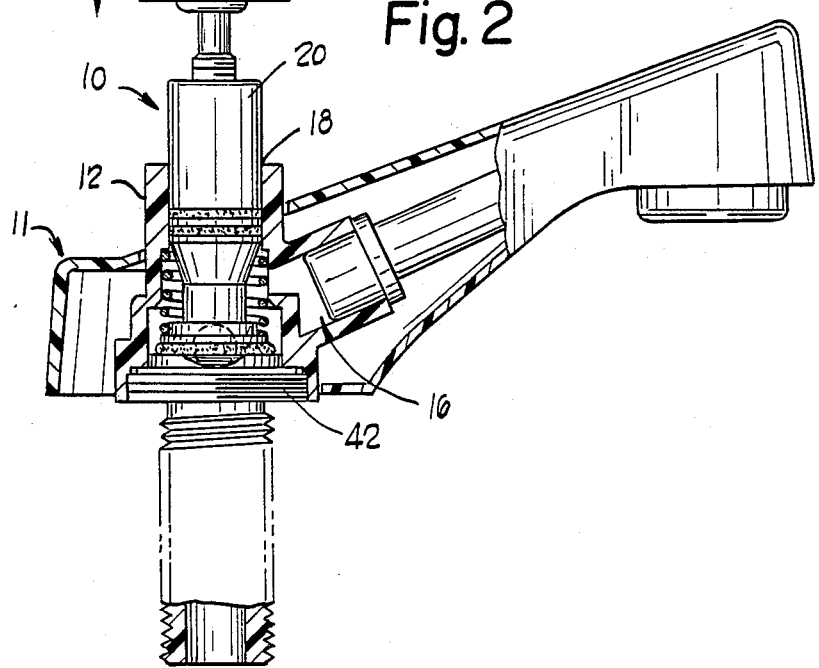
FIG. 2 is a side elevational view, partially in section, of the plumbing fixture of FIG. 1 as seen from the plane indicated by the line 2—2 in FIG. 1.

A valve diverter 10 constructed in accordance with the present invention is illustrated within the environment of a plumbing fixture 11 and comprises a valve body 12 having inlets 14, 15, first and second outlets 16, 18, a valve member 20, and first and second seals 28, 29 positioned for selectively closing either the first or second outlet when the valve member is in a first or second position, respectively.

The valve body 12 is proportionately configured to be located within the plumbing fixture 11. In a preferred embodiment, the body includes an internal central passage 30, an upper portion 36 and a lower portion 38. As shown in FIG. 5, first and second inlet portions 14, 15 project transversely from the lower portion of the valve body in opposite directions from one another. A flow control orifice 40 (FIG. 3) is positioned in the upper portion 36 of the valve body and is in communication with the first or basin outlet 16 that projects transversely from the valve body. The basin outlet accesses the plumbing fixture 11 such that water flows through the basin outlet 16 to a basin. A valve opening 18 is located along one end of the valve body 12, and is spaced from a wall 42 threadedly engaging the opposite end of the lower portion of the valve body 38. During operation, fluid flow is directed across an inner engagement surface 48 of the valve body having a valve seat 44.

The valve or diverter member 20, is positioned substantially within and extending through the central passage 30 of the valve body 12 and the valve opening 18. An external working surface 50 of the member operates in part in contacting relation with portions of the inner engagement surface 48 of the valve body 12. The valve member 20 includes an internal passage 22 having a first end or inlet opening 24, and an internally threaded second or accessory outlet 26 spaced from one another at opposite ends of the valve member. A flexible conduit 52 is preferably attached to the second outlet 26 using an externally threaded interconnection, and acts to receive flow from the valve device. The diverter member 20 is capable of reciprocation within the valve body, and acts to divert the flow of water entering the valve body 12 from an inlet 14 or 15 upon manual reciprocation of the member using the flexible conduit 52.

Figure 3:
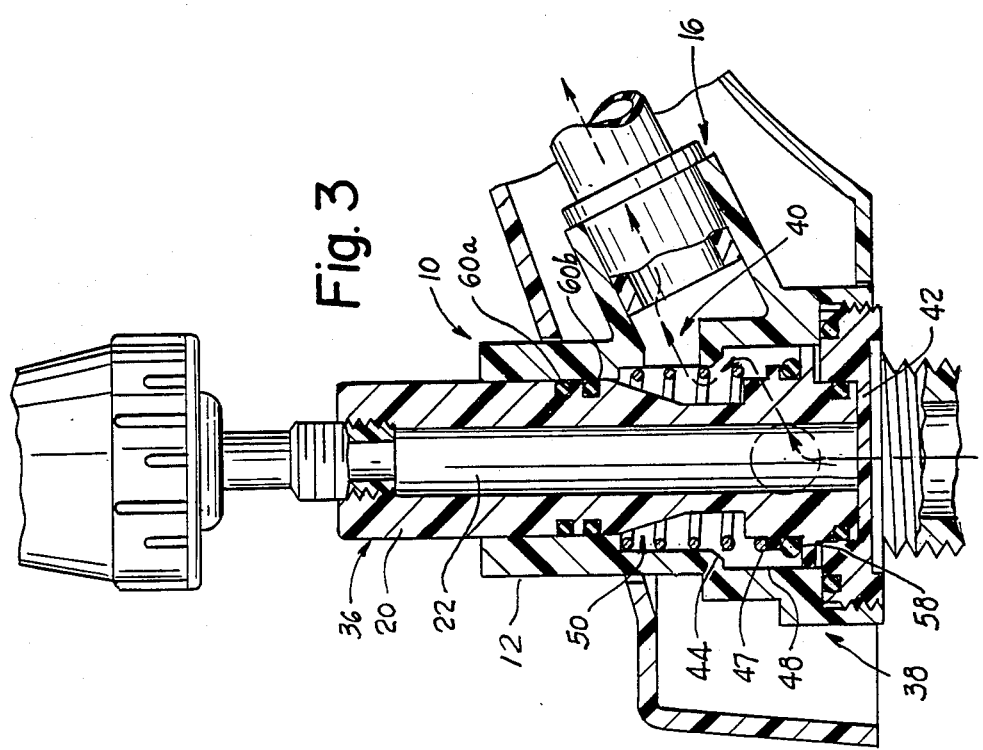
FIG. 3 is an enlarged sectional view of the diverter valve of the present invention in a position showing the flow of water to the faucet outlet.

The diverter member 20 is mechanically biased to a first position illustrated in FIG. 3, by a spring 32. The spring 32 is positioned between a first spring seat 46 on the valve body and a second spring seat 47 on the diverter member 20. When the member is in the first position, the fluid flow is directed through the first outlet 16 to the basin.

Figure 4:
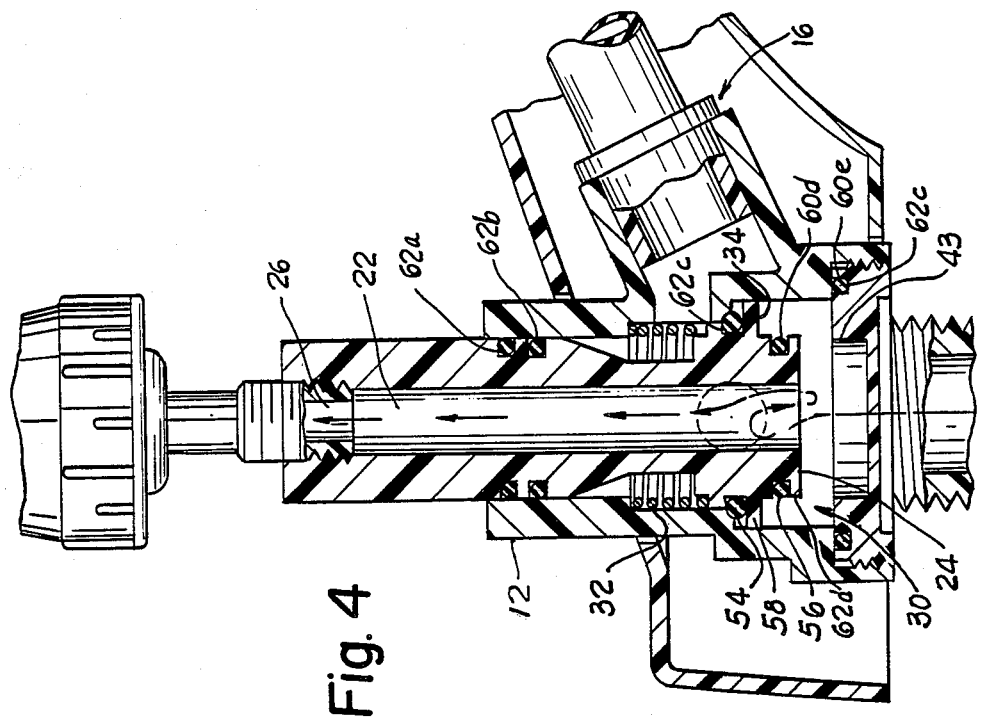
FIG. 4 is an enlarged sectional view of the diverter valve positioned to direct water flow to an accessory outlet.

The valve member 20 may be manually reciprocated to a second position shown in FIG. 4 where fluid flow is directed through the accessory outlet 26. The flexible conduit 52 extends from the outlet 26 to a hand-held shower head or other accessory device through which flow is directed when the member is in the second position. The valve member 20 may be moved to the second position using the flexible hose 52, and is maintained in second position against the bias of the spring by the fluid pressure acting upon the valve member 20 once it is moved.

When fluid is supplied to the inlets 14, 15 during operation of the fixture, the configuration of working surface 50 of the valve member and the inner engagement surface 48 of the valve body, as shown in FIG. 5, direct the fluid flow toward the first or second outlets, when the valve member is in the first or second position, respectively.

The surface 50 includes annular grooves 62a, 62b, 62c, 62d, for O-ring seals 60a, 60b, 60c, 60d, fluid-force receiving end surfaces 24, 34 and flange 58, that together act as a piston against which the force of the incoming fluid acts to hold the valve member in the position shown in FIG. 4 once it is manually moved to that position. The combination of surfaces 24, 35 provides sufficient surface area for incoming fluid, acting against the surfaces, to over come the spring force and support the valve member in the position of FIG. 4.

As shown in FIG. 4, a first seal 54 is positioned between the first and second ends 24, 26 of the diverter member. When the valve member 20 is in the second position, the first seal 54 engages the valve seat 44, and acts to prohibit fluid flow through the first outlet 16. A second seal 56 is positioned below the first seal 54 and, as shown in FIG. 3, engages a recess 43 located in the wall 42 which supports and surrounds the valve member 20 when in the first position. An additional seal 57, comprised of an annular groove 62e for an O-ring seal 60e in the wall 42, is provided between contacting portions of the lower portion of the valve body 38 and the wall 42.

Between the first and second seals 54, 56 the flange 58 communicates with the annular groove 62c and O-ring 60c at the first seal 54. The position of the flange 58 results in an engagement with the valve body that effectively controls fluid flow between the inner surfaces 48, 50. Rotational movement of the valve member about its vertical axis is prohibited by peripheral flat portions 59 on the flange 58 that slide along corresponding flats 49 (FIG. 5) of the valve body central passage 30.

Fluid enters the valve body via inlets 14, 15 during operation in the first position. Flow is then directed around and through the spring 32 along the central passage 30 between the inner engagement and working surfaces 48, 50. Fluid flow is contained within the valve body along the valve opening 18 by the seals 54, 56, and at the internal passage 22 by the abutment portion 58 and second seal 56. Fluid exits through the flow control orifice 40 to the outlet 16, and the basin of the plumbing fixture.

When use of the accessory device is desired, the valve member is manually moved to the second position by pulling the flexible conduit, whereupon fluid flow is directed through internal passage 22 of the valve member. The combination of the first seal 54 and the engagement between the flange 58 and valve seat 44, prohibits flow to the first outlet, and the flow enters and travels through the internal passage 22 of the valve member. After exiting the valve member, fluid is received by flexible conduit in communication with an accessory device such as a portable hand-held shower head. The member is maintained in second position by the fluid pressure acting upon the flange 58 and fluid force receiving end surfaces 24, 34 of the member. The valve member returns to its original position upon being manually moved to the first position or when an insufficient amount of pressure is exerted upon the surfaces 24, 34, as when control spigots controlling flow are turned off.

While a preferred embodiment of the invention has been disclosed in detail, the present invention is not to be considered to be limited to the precise constructions disclosed. Various adaptations and modifications of the invention may occur to those skilled in the art, and the invention is to cover all such adaptions and modifications falling within the scope or spirit of the appended claims.

I claim:

1. A valve for diverting the flow of water, said device comprising:
    (a) a valve body having an inlet and first and second outlets and a valve seat between the inlet and the first outlet;
    (b) a valve member in part received in said body and reciprocatable in said body, said valve member having an internal passage with a first end of said passage being within said body and a second end of said passage extending from said valve body second outlet to form a second fluid outlet as an alternate to the first outlet fluid discharge;
    (c) a first seal between said ends for selectively closing the first outlet when said valve member is in a second reciprocated position;
    (d) a second seal for closing that first end of the passage when the valve member is in a first reciprocated position;
    (e) a means for mechanically biasing the valve member to the first position;
    (f) said valve member having surface means constructed and arranged to be acted upon by the pressure of the fluid flowing through the valve body when the member is in the second position to retain the member in the second position during such flow; and
    (g) a flexible conduit connected to the second end of the internal passage outside the valve body, to receive the flow and by which the valve member can be manually reciprocated.

2. The device of claim 1 wherein the means for biasing said member to the first reciprocating position includes a spring for biasing said valve member to a position in which water flow is directed through said flow control orifice and first outlet to a basin.

3. A valve device for manually diverting the flow of water between outlets of a plumbing fixture, said device comprising:

(a) a body having an internal cavity, inlet portions projecting transversely from said body in generally opposite directions and an outlet portion projecting from said body and where said inlet and outlet portions are in communication with said cavity;

(b) a reciprocatable diverter member at least partially within the body cavity having an inlet opening and an outlet opening spaced from one another at opposite ends of said member and said member being movable between two positions one of which diverts flow through said outlet portion of the body and the other of which diverts water through the member outlet opening;

(c) a sealing means positioned between the body and diverter member to prevent water leakage between said body and diverter member;

(d) means forming part of the diverter member against which flowing water acts to maintain the diverter member in one of said positions that diverts water through the member outlet opening; and (e) connecting means on the diverter member for attaching a flexible conduit to the diverter member outlet opening in a fluid tight and force transmitting relation whereby a pulling force exerted on said flexible conduit will move said diverter member to the position in which water flows through said member outlet opening and into said flexible conduit.

4. The device of claim 3 wherein said sealing means includes seals located between the body and valve member to confine the flow of liquid exiting the device to said outlet portion or outlet opening.

5. In combination:

a sink fixture having hot and cold water inlets, an outlet to a basin, and an outlet to a flexible hose having a hand-held shower head for use as a shower;

a diverter valve device including a valve body having a first and second inlet portions and an outlet to said basin said device also including a diverter member within the valve body and extending from a valve body opening for diverting the flow of water entering the valve body upon manual movement of said member, said diverter member including an end projecting from the valve body having an outlet opening to said shower head, means for attaching said hose to said diverter member projecting end to facilitate moving said diverter member using the hose, and an inlet and outlet opening, said openings being spaced from one another at opposite ends of said member; said device further including a sealing means located between said valve body and diverter member for preventing leakage during operation, and a spring for biasing said diverter member to the position directing water flow to the basin outlet.

* * * * *